United States Patent [19]

Naae et al.

[11] Patent Number: 5,095,986
[45] Date of Patent: Mar. 17, 1992

[54] ENHANCED OIL RECOVERY USING OIL SOLUBLE SULFONATES FROM LIGNIN AND BENZYL ALCOHOL

[75] Inventors: Douglas G. Naae; Centha A. Davis, both of Houston, Tex.

[73] Assignee: Texaco, Inc., White Plains, N.Y.

[21] Appl. No.: 632,836

[22] Filed: Dec. 24, 1990

[51] Int. Cl.$^5$ .............................................. E21B 43/22
[52] U.S. Cl. .................................... 166/274; 166/275; 252/8.554
[58] Field of Search ....................... 166/273, 274, 275; 252/8.554

[56] References Cited

U.S. PATENT DOCUMENTS

| | | | |
|---|---|---|---|
| 4,307,782 | 12/1981 | Schievelbein | 166/274 |
| 4,438,002 | 3/1984 | Schievelbein | 166/275 X |
| 4,548,721 | 10/1985 | Debons et al. | 166/274 X |
| 4,756,370 | 7/1988 | Debons | 252/8.554 X |
| 4,781,251 | 11/1988 | Naae et al. | 166/274 |
| 4,787,454 | 11/1988 | Naae et al. | 166/275 X |
| 4,790,382 | 12/1988 | Morrow et al. | 252/8.554 X |

Primary Examiner—George A. Suchfield
Attorney, Agent, or Firm—Jack H. Park; Kenneth R. Priem; Harold J. Delhommer

[57] ABSTRACT

The invention is a method of producing oil soluble surfactants from lignin which comprises reacting benzyl alcohol with lignin phenol at elevated temperature in the presence of a non-nucleophilic basic catalyst to produce a lignin phenol reaction product, and sulfonating the lignin phenol reaction product to produce an oil soluble lignin surfactant, said lignin phenol produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature greater than about 200° C. and a pressure greater than about 100 psi, and recovering the oil soluble lignin phenol from the reduction mixture.

10 Claims, No Drawings

ENHANCED OIL RECOVERY USING OIL SOLUBLE SULFONATES FROM LIGNIN AND BENZYL ALCOHOL

BACKGROUND OF THE INVENTION

This invention relates to a method of producing surfactants from lignin. More particularly, the invention discloses a process of reacting a lignin phenol with benzyl alcohol and sulfonating the reaction product. These oil soluble compounds may be used in surfactant flooding to recover hydrocarbons from underground formations.

Surface active compounds or surfactants have become extremely important chemicals in our society. Numberless types of surfactants are used for a myriad of applications. To work effectively, most surfactants require water soluble and oil soluble characteristics. It is these mixed characteristics which enable surfactants to lower the surface tension between two disparate liquids.

One problem with many surfactants is their high cost of manufacture. Surfactants which are relatively cheap have an inherent advantage in the marketplace.

A minor use of surfactants has been in surfactant flooding systems for enhanced oil recovery. But because of the relatively high cost of surfactants, surfactant flooding systems for oil recovery have generally not been economical.

Surfactant flooding to recover oil has been actively investigated due to the relatively poor ability of waterfloods to displace remaining oil from a reservoir's pore structure. Because of the reservoir structure and surface tensions involved, the floodwater may form channels or fingers, bypassing the oil in the formation.

Investigations of ways to increase oil recovery by improving the displacement ability of waterfloods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a waterflood operation is dependent upon reservoir characteristics as well as the cost and availability of the surfactants.

Lignin is a by-product that the pulping industry produces in prodigious amounts. As a result, a large research effort has been undertaken over the last 40 years in attempts to find uses for the large volume of lignin by-product.

Lignin is comprised of polymeric chains having molecular weights over 10,000 with multiple different units. One substantial monomeric unit contained in the lignin polymeric chains is propane phenol.

U.S. Pat. Nos. 4,739,041 and 4,790,382 describe a method of producing water soluble surfactants from lignin which comprises subjecting lignin to two reactions, alkylation and oxidation. U.S. Pat. Nos. 4,739,040 and 4,787,454 disclose a method of surfactant flooding with lignin surfactants produced by reducing lignin in the presence of a carbon monoxide or hydrogen reducing agent at high temperature and pressure to produce low molecular weight lignin phenols, and subjecting the lignin phenols to one or a combination of several reactions such as 10 alkoxylation, alkylation, sulfonation, sulfation, alkoxysulfation, and sulfomethylation.

Another water soluble lignin surfactant variation is disclosed in U.S. Pat. No. 4,781,251 wherein an alkylphenol lignin surfactant is employed in a surfactant flooding system. The alkylphenol lignin surfactant is produced by reacting an alkylphenol having about 6 to about 15 carbon atoms in the alkyl chain with formaldehyde in basic solution at elevated temperature to form a first reaction product. The first reaction product is then reacted with a kraft lignin at elevated temperature to form an alkylphenol lignin reaction product. Finally, the alkylphenol lignin reaction product is made more water soluble by a reaction selected from the group consisting of sulfonation, sulfation, alkoxysulfonation, alkylsulfation and alkoxylation to produce the alkylphenol lignin surfactant.

A copending application Ser. No. 632,676, filed Dec. 24, 1990, discloses the preparation of a lignin surfactant by sulfonating a lignin phenol and reacting the lignin phenol sulfonate with the reaction product of alkylphenol and formaldehyde. A second copending application Ser. No. 464,480, filed Jan. 12, 1990, teaches a method of making an oil soluble lignin surfactant by alkoxylating lignin phenol and subjecting the alkoxylated lignin phenol to a second reaction of sulfonation, sulfation or alkoxysulfation.

SUMMARY OF THE INVENTION

The invention is a method of producing oil soluble surfactants from lignin which comprises reacting benzyl alcohol with lignin phenol at elevated temperature in the presence of a non-nucleophilic basic catalyst to produce a lignin phenol reaction product, and sulfonating the lignin phenol reaction product to produce an oil soluble lignin surfactant.

The lignin phenol is produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature greater than about 200° C. and a pressure greater than about 100 psi, and recovering the oil soluble lignin phenol from the reduction mixture.

The invention also includes using these oil soluble surfactants in surfactant floods for enhanced oil recovery.

DETAILED DESCRIPTION

Because lignin is a high volume by-product of the pulping industry, it is a very cheap starting material. The use of these surfactants derived from lignin may reduce surfactant costs for enhanced oil recovery floods by as much as 40% to 60%.

The reaction of benzyl alcohol and lignin phenol and subsequent sulfonation of the reaction product forms a group of compounds having oil soluble surfactant properties. These compounds have at least two cyclic ring structures to which a sulfonate group, a quite variable hydrocarbon group and sometimes a hydroxy or ether linkage group are attached. Some of the compounds may have more than two rings or other substituents. However, the group of products which results from this process are efficient surfactants.

The use of the term "lignin surfactant" herein refers to oil soluble surfactants derived from lignin according to the invention process. The term "lignin phenol" refers to the reduction product of lignin which is reduced in the presence of carbon monoxide or hydrogen at a temperature greater than about 200° C. and a pressure greater than about 100 psi.

The invention oil soluble lignin surfactants are used in a multistep process. First, benzyl alcohol is reacted with lignin phenol in the presence of a non-nucleophilic basic catalyst, such as potassium tertiary butoxide or sodium hydride at an elevated temperature, preferably about 150° C. to about 250° C., to produce a lignin phenol reaction product. Second, the lignin phenol reaction product is sulfonated to produce an oil soluble lignin surfactant. The lignin phenol is produced by placing lignin in contact with water and converting the lignin into low molecular weight lignin phenol by reducing the lignin in the presence of a reducing agent of carbon monoxide or hydrogen which creates a reduction reaction mixture comprising oil soluble lignin phenol. The reduction occurs at a temperature greater than about 200° C. and a pressure greater than about 100 psi. The lignin phenol is recovered from the reaction mixture.

The basic monomeric unit of lignin is propane phenol. The compound structures illustrated below indicate the basic structural changes undergone by lignin phenol and benzyl alcohol with later sulfonation according to the invention. As discussed later, it is believed that the final reaction product is a mixture of two products that result from two reaction mechanisms, a condensation reaction and a Williamson ether synthesis. Please note that the structure of lignin and the lignin phenol derivative is complex and variable and not completely represented herein.

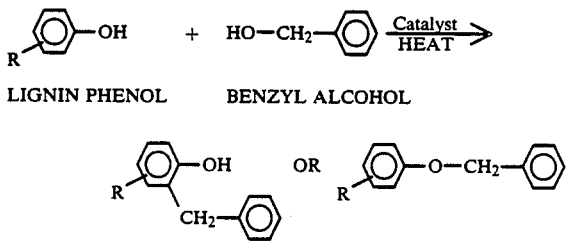

where R is the remaining portion of the variable lignin phenol molecule.

The catalyst acts as a base and not a nucleophile. It can only remove a phenolic proton rather than participate in the reaction. Possible catalysts include non-nucleophilic bases such as potassium tertiary butoxide and sodium hydride.

The lignin phenol reactant is produced by a multistep process from lignin. The lignin is first reduced at elevated temperature and pressure in the presence of carbon monoxide or hydrogen to yield a lignin phenol and then sulfonated.

The reductive degradation of lignin under these selected conditions produces a complex mixture of low molecular weight lignin phenols that are generally derived from or based on a propylphenol structure which has high solubility in organic solvents. Analysis of the lignin phenol reaction product indicates an average molecular weight of about 300 and a range of about 150 to about 1000, compared to a propylphenol molecular weight of 136 and lignin molecular weight of 3000 to 15,000. It is believed that the lignin phenol product is composed of 2, 3, 4, or more propane phenols linked or fused together plus assorted methoxyls, hydroxyls and other oxygens. Another major difference between the lignin phenol reduction product and lignin is that the reduction reaction decreases oxygen content by weight from about 25-30% to about 5-10%. Whenever the phrase "lignin phenol" is used herein, it refers to the above product mixture and not propylphenol or lignin.

The reduction reaction is carried out by placing a lignin in contact with water. The lignin may be dissolved or slurried in an aqueous medium at concentrations preferably ranging from about 5% to about 20% by weight. Sodium hydroxide or a similar compound may also be placed in the aqueous medium in a concentration of about 1% to about 15% by weight to increase lignin solubility. The reducing agent is injected into the reaction vessel to blanket the reduction reaction mixture at an initial pressure greater than about 100 psi, preferably greater than about 500 psi. The reducing gas is preferably carbon monoxide or hydrogen or a mixture of both.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

A catalyst may be employed to increase the yield. A ferrous salt is the preferred catalyst for hydrogenation of lignosulfonate. Other metal ions which may be used to catalyze the lignosulfonate hydrogenation are: cobalt, molybdenum, nickel and aluminum. When it is desired to reduce kraft lignin, alkali lignin, or desulfonated lignosulfonate by hydrogenation, it is preferred to use about 1% to about 15% by weight of a Raney nickel catalyst, based on the weight of the kraft lignin.

In general, the hydrogen reduction reaction should be allowed to proceed at reaction temperature and pressure for a period of about 30 minutes to about 5 hours and the carbon monoxide reduction for a time period of about 15 minutes to about 2 hours. The oil soluble lignin phenols can then be extracted from the reduction reaction mixture with an organic solvent. Preferred solvents are ether, diethylether, tetrahydrofuran, benzene and toluene. The lignin phenols may then be ethoxylated and sulfated by means known in the art.

The reduction of lignin by hydrogen and carbon monoxide and their ethoxylation and sulfation is discussed in detail in U.S. Pat. No. 4,739,040, the disclosure of which is incorporated herein by reference.

The lignin phenol/benzyl alcohol reaction product is sulfonated by reactions known in the art. Further details as to sulfonation reactions with lignin phenols may be found in U.S. Pat. No. 4,739,040, previously incorporated by reference.

A preferred sulfonation method is to sulfomethylate the lignin phenol reaction product with formaldehyde and sodium sulfite or sodium bisulfite. The sulfomethylation reaction adds the sulfomethylene group (—CH$_2$SO$_3$Na). Sulfuric acid, sulfur trioxide, or sulfur trioxide-dioxane complex may also be used to sulfonate.

Previous tests have indicated that SO$_3$ stoichiometry is important. An excess of SO$_3$ may over-sulfonate the reaction product and give an eventual product with higher interfacial tension values.

Unlike U.S. Pat. No. 4,781,251 the invention process reacts benzyl alcohol with a lignin phenol instead of lignin and then sulfonates the reaction product. Benzyl alcohol plus lignin phenol is not a very reactive process. It is believed that sulfonation prior to reaction leaves a sulfonate group that serves as a deactivating group on a ring and further slows down the reaction.

The present invention also differs from the invention surfactants disclosed in copending application Ser. No. 632,676 filed Dec. 24, 1990, in that the copending application requires the sulfonation of lignin phenol prior to the reaction of lignin phenol sulfonate with the reaction product of an alkylphenol and formaldehyde. When these compounds were sulfonated after reaction of alkylphenol/formaldehyde/lignin phenol, a tarry polymer was produced that did not have the desired properties. It should be noted again that the present invention requires that sulfonation occur only after the catalyzed reaction of benzyl alcohol and lignin phenol.

SURFACTANT FLOODING SYSTEMS

The invention also includes the injection of a surfactant flooding system into a reservoir to recover underground hydrocarbons, where the surfactant flooding system contains lignin surfactants produced by the above described process. Depending upon the surfactant formulation, some of these surfactants may be employed as sole surfactants, cosurfactants, or solubilizers in a surfactant flooding system. They may also be used to substitute for a certain percentage of an existing surfactant in a surfactant flooding system to lower the overall cost of the surfactants employed in the flooding system. Many of the lignin surfactants produced according to the above described process provide low interfacial tensions between oil and water, and form stable surfactant systems with many of the commercially available enhanced oil recovery surfactants now on the market.

It is well-known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10% by weight. A typical surfactant system may be:

1. one or more petroleum sulfonates such as
   (a) a water soluble sulfonate having a relatively low equivalent weight, or
   (b) an oil soluble sulfonate having a relatively high equivalent weight, or
   (c) any other commercially available petroleum sulfonates;
2. a solubilizer or cosurfactant;
3. brine; and
4. optionally, a light hydrocarbon.

As mentioned before, surfactant flooding systems can be formulated under some conditions without a solubilizer and with only a sole surfactant. Other components may be blended into the surfactant slug. Petrochemical and synthetic sulfonates may be substituted for petroleum sulfonates. The surfactant slug may also be preceded by a sacrificial agent, or contain viscosity improving polymers or a sacrificial agent.

Of course, not every combination of components will yield a stable and active surfactant system. Surfactant systems may be stable or unstable and have varying degrees of surfactant activity depending upon the specific lignin surfactants, other surfactants, solubilizer, and brine employed in a particular system. It is well-known in the art that each surfactant system must be tested. One cannot rely upon generalities as to stability or surfactant activity in multi-component surfactant systems.

The present invention resides in the use of about 0.1% to about 10% concentration by weight of lignin surfactants in any surfactant flooding system to recover underground hydrocarbons, wherein the lignin surfactants are prepared according to the described process. Additional surfactants other than the lignin surfactants may be included in the surfactant flooding systems.

Surfactant systems are generally pushed through the formation towards a production well by the subsequent injection of a drive fluid. The drive fluid is usually water, gas or water viscosified by a polymer. Hydrocarbons and other fluids are then recovered at one or more production wells.

The following examples will further illustrate the present invention which discloses a method for producing surfactants from lignin and employing such lignin surfactants in surfactant flooding systems. These examples are given by way of illustration and not as limitations on the scope of the invention. Thus, it should be understood that reaction steps and amounts may be varied with a process still remaining within the scope of the invention.

EXAMPLES 1-5

A 1:1 mixture of lignin phenol (15.13 g) and benzyl alcohol (5.5 g) was reacted at 190° C. for 7½ hours in a round bottom flask with 20% potassium tert-butoxide (1.11 g) as the catalyst. No reaction solvent was used.

The progress of the reaction was followed by high performance liquid chromatography (HPLC). The retention time on the product increased because of increased oleophilicity of the lignin phenol due to the benzyl alcohol. HPLC showed the reaction to be successful. Table 1 lists the analysis of the lignin phenol/benzyl alcohol reaction products.

Lignosite 458 is a trademarked desugared sodium lignosulfonate sold by Georgia Pacific Corp. Indulin AT is a trademarked purified pine kraft lignin sold by Westvaco Corp. with a lignin content of 93%.

TABLE 1

| | ANALYSIS OF LIGNIN PHENOL/BENZYL ALCOHOL PRODUCTS | | | | | | |
|---|---|---|---|---|---|---|---|
| | | REACTANT | | | | | |
| | | PRODUCT | | | | | |
| Ex. | Lignin Phenol Reactant Product | Mol. Wt.[1] $\overline{M}_n$ Reactant Product | COOH meq/g Reactant Product | $\phi$OH meq/g Reactant Product | Calculated Molecular Weight | $\phi$OH meq/g, Predicted from Reaction Mechanisms | |
| | | | | | | Condensation | 1:1 Condensation:Williamson |
| 1 | B[2] Product | 196 266 | 0.20 0.48 | 3.73 1.22 | 279 | 2.62 | 1.31 |

TABLE 1-continued
ANALYSIS OF LIGNIN PHENOL/BENZYL ALCOHOL PRODUCTS

| Ex. | Lignin Phenol Reactant Product | Mol. Wt.[1] $\overline{Mn}$ Reactant Product | COOH meq/g Reactant Product | φOH meq/g Reactant Product | Calculated Molecular Weight | φOH meq/g, Predicted from Reaction Mechanisms Condensation | 1:1 Condensation:Williamson |
|---|---|---|---|---|---|---|---|
| 2 | C[3] Product | 228 383 | 0.22 0.40 | 3.06 1.13 | 311 | 2.24 | 1.12 |
| 3 | C[3] Product | 309 352 | 0.37 0.45 | 2.76 1.45 | 414 | 2.06 | 1.03 |
| 4 | A[4] Product | 292 355 | 0.15 0.39 | 2.84 1.23 | 387 | 2.15 | 1.08 |
| 5 | D[5] Product | 218 287 | 0.27 0.55 | 4.12 1.92 | 321 | 2.79 | 1.40 |

[1]Determined by vapor pressure osmometry using tetrahydrofuran as a solvent at 45° C.
[2]Lignin Phenol B was produced by combining the water soluble extracts of several lignin phenol products of Lignosite 458.
[3]Lignin Phenol C was produced from an aqueous solution of Lignosite 458 reduced under 1000 psi carbon monoxide blanket with 1% NaOH at 410° C. for 30 minutes.
[4]Lignin Phenol A was produced from Indulin AT slurried in tetralin and reduced under a 1000 psi hydrogen blanket at 410° C. for 30 minutes.
[5]Lignin Phenol D was produced from Indulin AT slurried in decalin and reduced under a 1000 psi hydrogen blanket at 410° C. for 30 minutes.

The analytical results of Table 1 illustrate how the reaction changes the lignin phenol properties. The molecular weight for each reaction product was determined analytically and calculated by using the reaction stoichiometry. The calculated values were similar to those found by analysis.

The phenol ($\phi$OH) values can be used to determined which reaction mechanism is occurring from the choices of condensation, Williamson ether synthesis, or a combination of both mechanisms. If the condensation reaction is the principle reaction, then the total number of $\phi$OH sites (groups) in the product will be the same as before reaction. During condensation, benzyl alcohol does not react with the $\phi$OH groups. For instance, Example 2 reacted 15.13 g (46.3 meq $\phi$OH) of lignin phenol (3.06 meq/g $\phi$OH) with 5.5 g of benzyl alcohol. After the reaction with benzyl alcohol, there would still be 46.3 meq $\phi$OH with the condensation reaction because benzyl alcohol would not react with the $\phi$OH groups. The total weight of the product would be 20.63 g (15.13 g plus 5.5 g). This would give a product of 2.24 meq/g $\phi$OH (46.3 meq/20.63 g).

If the Williamson ether synthesis reaction is the principle reaction, then the total number of $\phi$OH sites in the product would be zero. During this reaction, the benzyl alcohol reacts with all of the available $\phi$OH groups. Since every product in Table 1 showed titratable $\phi$OH groups, the Williamson ether synthesis reaction cannot be the sole reaction occurring.

If the reaction mechanism is a 1:1 combination of the condensation reaction and the Williamson ether synthesis reaction, then the reaction would form an equal mixture of the two products. Half of the $\phi$OH groups would be consumed because they react with benzyl alcohol. For Example 2, half of the $\phi$OH groups (23.15 meq $\phi$OH (46.3 meq÷2)) would still be present after the reaction with benzyl alcohol. When all 15.13 g of lignin phenol reacts with all 5.5 g of benzyl alcohol in this manner, we have 20.63 g of product with 23.15 meq $\phi$OH or 1.12 meq/g $\phi$OH (23.15 meq/20.63 g). Thus, the mixed reaction mechanism is occurring in Example 2 because a value of 1.13 meq/g $\phi$OH was found for the product in weak acid titration.

A comparison of the $\phi$OH values determined analytically in Table 1 to the $\phi$OH values predicted by the reaction mechanisms shows the actual reaction mechanism to be a combination of the condensation and the Williamson ether synthesis reactions.

EXAMPLES 6-10

Each of the benzyl alcohol/lignin phenol reaction products were sulfonated with a 1:1 complex of sulfur trioxide/dioxane and trichloromethane (an inert solvent) to produce the oil soluble lignin surfactants with increased surface activity. The results of the sulfonated benzyl alcohol/lignin phenol reactions are listed in Table II.

TABLE 2
SULFONATED BENZYL ALCOHOL/LIGNIN PHENOL REACTION RESULTS

| Example | Benzyl Alcohol/ Lignin Phenol Of Example | % Ether Soluble | % Ether Insoluble[1] |
|---|---|---|---|
| 6 | 1 | 46 | 54 |
| 7 | 2 | 51 | 49 |
| 8 | 3 | 34 | 66 |
| 9 | 4 | 32 | 68 |
| 10 | 5 | 29 | 71 |

[1]This is the sulfonated product.

The sulfonated reaction mixtures of Examples 6-10 were separated into two fractions by extraction with ether. According to HPLC analysis, the sulfonated product is the ether insoluble product. In the past, lignin phenol products were converted to lignin surfactants by other reactions and sulfonated. These other sulfonated lignin phenol reaction products were always water soluble. The sulfonated benzyl alcohol/lignin phenol products are water insoluble as well as ether insoluble. Due to the water insolubility of these products, interfacial tension values could not be determined in any field brine.

Many other variations and modifications may be made in the method described above by those skilled in the art without departing from the concepts of the present invention. Accordingly, it should be clearly understood that the concepts disclosed in the description are illustrative and are not intended as limitations on the scope of the invention.

What is claimed is:

1. A method of recovering hydrocarbons from an underground formation penetrated by at least one injection well and at least one production well, which comprises:

injecting into an underground formation through an injection well about 0.1 to about 0.6 pore volumes of an aqueous surfactant slug comprising about 0.1% to about 10% by weight of an oil soluble lignin surfactant, said oil soluble lignin surfactant produced by reacting benzyl alcohol at elevated temperature with a lignin phenol in the presence of a non-nucleophilic basic catalyst to produce a lignin phenol reaction product;

sulfonating the lignin phenol reaction product to produce an oil soluble lignin surfactant, said lignin phenol produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature greater than about 200° C. and a pressure greater than about 100 psig, and recovering the oil soluble lignin phenol from the reduction mixture;

injecting into the formation through the injection well a drive fluid to push the surfactant slug towards the production well; and recovering hydrocarbons at the production well.

2. The method of claim 1, further comprising the use of a water soluble surfactant in the surfactant slug.

3. The method of claim 1, further comprising the use of a solubilizer in the surfactant slug.

4. The method of claim 1, wherein the drive fluid is an aqueous polymer solution.

5. The method of claim 1, wherein the catalyst is potassium tertiary butoxide or sodium hydride.

6. The method of claim 1, wherein the reaction of benzyl alcohol and lignin phenol takes place at about 150° C. to about 250° C.

7. The method of claim 1, wherein the lignin phenol is sulfonated with sulfuric acid, sulfur trioxide or sulfur trioxide/dioxane complex.

8. The method of claim 1, wherein the reducing agent of hydrogen or carbon monoxide blankets the reduction reaction mixture at an initial pressure greater than about 500 psig.

9. The method of claim 1, wherein the reduction reaction occurs at a temperature of about 300° C. to about 550° C.

10. A method of recovering hydrocarbons from an underground formation penetrated by at least one injection well and at least one production well, which comprises:

injecting into an underground formation through an injection well about 0.1 to about 0.6 pore volumes of an aqueous surfactant slug comprising about 0.1% to about 10% by weight of an oil soluble lignin surfactant;

reacting benzyl alcohol with a lignin phenol at a temperature between about 150° C. and about 250° C. in the presence of a potassium tertiary butoxide or sodium hydride catalyst to produce a lignin phenol reaction product;

sulfonating the lignin phenol reaction product to produce an oil soluble lignin surfactant, said lignin phenol produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature between about 300° C. and about 550° C. and a pressure greater than about 500 psig, and recovering the oil soluble lignin phenol from the reduction mixture;

injecting into the formation through the injection well a drive fluid to push the surfactant slug towards the production well; and recovering hydrocarbons at the production well.

* * * * *

UNITED STATES PATENT AND TRADEMARK OFFICE
CERTIFICATE OF CORRECTION

PATENT NO. : 5,095,986
DATED : March 17, 1992
INVENTOR(S) : Douglas Gene Naae and Centha Ann Davis It is certified that error appears in the above-identified patent and that said Letters Patent is hereby corrected as shown below:

Column 10, Claim 10, line 20, please add --said oil soluble lignin surfactant produced by-- before "reacting".

Signed and Sealed this

First Day of June, 1993

Attest:

MICHAEL K. KIRK

Attesting Officer

Acting Commissioner of Patents and Trademarks